(12) United States Patent
Thunuguntla et al.

(10) Patent No.: US 11,907,196 B1
(45) Date of Patent: Feb. 20, 2024

(54) GENERATING OBSERVABILITY METRICS FOR DATA LAKE USAGE BASED ON DATA LAYER ACTIVITY LOGS

(71) Applicant: INTUIT INC., Mountain View, CA (US)

(72) Inventors: Saikiran Sri Thunuguntla, Bangalore (IN); Keshav Bhashyam, Bangalore (IN); Sreenivasulu Nallapati, Bangalore (IN); Vijaykumar Hiremath, Bangalore (IN)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 18/326,889

(22) Filed: May 31, 2023

(51) Int. Cl.
*G06F 16/22* (2019.01)
*G06F 16/11* (2019.01)
*G06F 16/21* (2019.01)
*G06F 16/28* (2019.01)

(52) U.S. Cl.
CPC ........ *G06F 16/2282* (2019.01); *G06F 16/113* (2019.01); *G06F 16/21* (2019.01); *G06F 16/285* (2019.01)

(58) Field of Classification Search
CPC ....... G06F 16/13; G06F 16/2282; G06F 16/21
USPC ........................................................ 707/609
See application file for complete search history.

(56) References Cited

U.S. PATENT DOCUMENTS

| | | | | |
|---|---|---|---|---|
| 8,788,335 B2* | 7/2014 | Rose | ................. | G06Q 30/0273 705/14.4 |
| 2007/0130133 A1* | 6/2007 | Lee | ..................... | G06F 16/2443 |
| 2011/0252073 A1* | 10/2011 | Pauly | ................... | G06F 16/213 707/812 |
| 2023/0205757 A1* | 6/2023 | Gupta | ................ | G06F 16/2246 707/703 |

* cited by examiner

*Primary Examiner* — Hung T Vy
(74) *Attorney, Agent, or Firm* — DLA PIPER LLP (US)

(57) ABSTRACT

Incoming data requests from the perspective of the data lake, are gathered and analyzed to determine the usage of the data. Using the perspective of the data lake avoids the technical challenge of analyzing data usage by different computation points, which are at different locations, perform hard-to-track different operations, and are often reachable only through complicated access protocols. Another technical challenge of mapping between an object path and a table path is solved by generating object path datasets and table path datasets at different levels of abstractions. A comparison is performed, iteratively, from a lower level of granularity and the granularity is increased in the progressive steps. Matches from iterations are unionized to generate a final matching data. Observability metrics are generated using final matching data and are used to perform downstream operations such as controlling data table access, moving data tables to cold storage, decommissioning unused pipelines, etc.

20 Claims, 8 Drawing Sheets

US 11,907,196 B1

GENERATING OBSERVABILITY METRICS FOR DATA LAKE USAGE BASED ON DATA LAYER ACTIVITY LOGS

BACKGROUND

Modern day analytics and machine learning models use and process a vast amount of data. The data is generally stored in data lakes, typically in an online analytical processing (OLAP) format. The data lakes are hosted by cloud providers such as Amazon web services (AWS), Microsoft Azure, etc.

A data lake is inherently based on a "kitchen sink" approach, where different computation points (e.g., analytics applications) within an organization continuously and relentlessly generate data (e.g., data tables) and dump it into the data lake. Data is also continuously gathered from customer facing pipelines and dumped into the data lake. Furthermore, the data tables in the data lake are generally designed to be immutable, so any new computation involves creating new copies of the data tables, performing operations on them, and storing the results as new data tables. Within a complex organization with different and varied computation points, the amount of data stored in the data lake increases exponentially every day, creating a jumbled forest of data tables.

This approach generates a host of technical problems. First, an analyst who intends to run analytics on a data table will be unsure whether a particular table is the most up-to-date copy. Another computation point may have updated the data table and stored it as a new copy with a similar filename. The analyst will therefore see a dozen data tables with the same filename, and will not have the knowledge about their freshness, or whether they are in sync, different, or derivative of each other. Another analyst may observe that there are main data tables, staging data tables, and backup data tables, without a metric on which data tables are to be trusted. Second, a computation point may create a data table and store it in the data lake, and the data table may not be accessed/used again. Third, there may be different pipelines that may be continuously dumping data in the data lake, and this continuously dumped data may never be used by any analytics applications and computation points. Fourth, in this huge jumble of data tables, it will be hard to determine which data tables are complaint with various data privacy laws in different jurisdictions. For example, if there is a request from a user to purge his/her personal data, the system should be able to access and delete all of the associated data tables. This will be a difficult task due to the jumbled data, meaning that the data lakes inadvertently create unnecessary compliance risks.

Therefore, the continuous dumping of data—to ensure that nothing is lost—generates a lot of useless information, which clutters the useful information. For example, it will be difficult for analytics applications to sift through useless data tables to reach an up-to-date copy of an intended data table. Furthermore, the continuous dumping generates a huge storage cost, for example, when the pipelines dumping useless data are not flagged and de-commissioned. Additionally, useless data generated by the computation points is needlessly retained. All of these situations and consequences are undesirable.

Therefore, a significant improvement towards increasing the efficiency of storage in and access to a data lake is desired.

SUMMARY

Embodiments disclosed herein solve the aforementioned technical problems. One or more embodiments analyze access of data tables at the data layer, e.g., the data lake itself. In other words, incoming data requests from the perspective of the data lake are gathered and analyzed to determine the usage of the data. Using the perspective of the data lake avoids the technical challenge of analyzing data usage by different computation points, which are at different locations, perform hard-to-track and different operations, and may be reachable only through complicated access protocols.

Another technical challenge of mapping between an object path (the path received by the data lake to access a data table) and a table path (physical address in the data lake where the data table is stored) is solved by generating object path datasets and table path datasets at different levels of abstractions. A comparison is performed, iteratively, from a lower level of granularity and the granularity is increased in the progressive steps. Matches from iterations are unionized to generate final matching data. Observability metrics are generated using final matching data and are used to perform downstream operations such as controlling data table access, moving data tables to cold storage, decommissioning unused pipelines, etc.

In one or more embodiments, a computer-implemented method is provided. The method includes generating an object path dataset comprising a plurality of rows of object paths for accessing corresponding data tables in a data lake and generating a table path dataset comprising a plurality of rows of table paths of physical addresses for the corresponding data tables in the data lake. The method also includes expanding columns of the object path dataset to generate an expanded object path dataset by adding a plurality of additional columns, each additional column including object paths with a portion of information stripped away from corresponding object paths in the previous column and expanding rows of the table path dataset to generate an expanded table path dataset by adding an additional row for each original row, the additional row comprising a corresponding table path without partition information. The method further includes iteratively matching the columns of the expanded object path dataset to the original rows and the additional rows and generating observability metrics of access of the data tables based on the iterative matching.

In one or more embodiments, a system is provided. The system includes a non-transitory storage medium storing computer program instructions and a processor configured to execute the computer program instructions to cause operations. The operations include generating an object path dataset comprising a plurality of rows of object paths for accessing corresponding data tables in a data lake and generating a table path dataset comprising a plurality of rows of table paths of physical addresses for the corresponding data tables in the data lake. The operations also include expanding columns of the object path dataset to generate an expanded object path dataset by adding a plurality of additional columns, each additional column including object paths with a portion of information stripped away from corresponding object paths in the previous column and expanding rows of the table path dataset to generate an expanded table path dataset by adding an additional row for each original row, the additional row comprising a corresponding table path without partition information. The operations further include iteratively matching the columns of the expanded object path dataset to the original rows and the additional rows and generating observability metrics of access of the data tables based on the iterative matching.

DETAILED DESCRIPTION OF SEVERAL EMBODIMENTS

One or more embodiments provide classifying data tables within a data lake based on logged access activities to the data tables. Particularly, observability metrics are built from the point of view of the data layer by analyzing access logs (e.g., cloudtrail logs). The fundamental challenge of variability of operations and results at the computation points is solved by making observations directly at the data layer, e.g., to determine which data tables in the data lake are being utilized. Another fundamental challenge is the mismatch between an object path (e.g., path used to access a data table) and table path (e.g., the physical address of the data table). For instance, the object path may not necessarily have partition information that is used by the table path. Furthermore, the trailing information on the object path may continuously change as copies of the same data table may be accessed and stored using different object path names (e.g., generating multiple copies of the same data table). Embodiments disclosed herein, as described below solve these problems.

Figure 1:
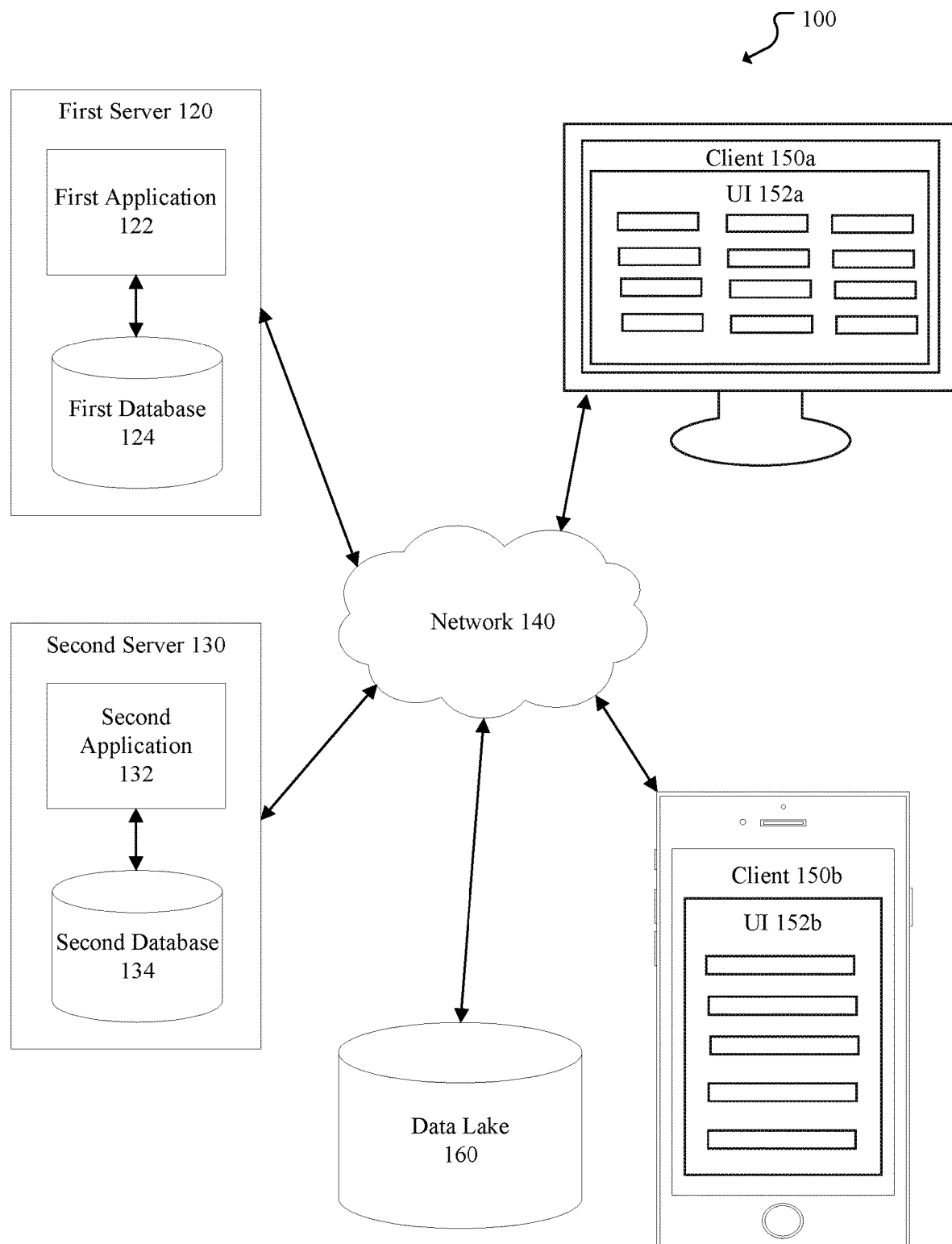
FIG. 1 shows an example of a system configured for generating observability metrics, based on the principles disclosed herein.

FIG. 1 shows an example of a system 100 configured for generating observability metrics, based on the principles disclosed herein. It should be understood that the components of the system 100 shown in FIG. 1 and described herein are merely examples and systems with additional, alternative, or fewer number of components should be considered within the scope of this disclosure.

As shown, the system 100 comprises client devices 150*a*, 150*b* (collectively referred to herein as "client devices 150"), servers 120, 130, and a data lake 160 interconnected by a network 140. The first server 120 hosts a first server application 122 and a first database 124 and the second server 130 hosts a second server application 132 and a second database 134. The client devices 150*a*, 150*b* have user interfaces 152*a*, 152*b*, respectively, (collectively referred to herein as "user interfaces (UIs) 152"), which may be used to communicate with the server applications 122, 132 and the data lake 160 using the network 140.

The data lake 160 includes a database maintained by a cloud service provider. For example, the data lake 160 includes AWS S3 storage storing a plurality of data tables as hive tables in a plurality of buckets. The server applications 122, 132 sends the data to the data lake 160 to perform various analytic operations. Additionally, the server applications 122, 132 may perform the embodiments of generating the observability metrics, as described throughout this disclosure.

The server applications 122, 132 use corresponding databases 124, 134 to store data such as company specific applications related data, customers data, and/or any other type of data generated during the course of implementing the embodiments disclosure herein.

Communication between the different components of the system 100 is facilitated by one or more application programming interfaces (APIs). APIs of system 100 may be proprietary and or may include such APIs as AWS APIs or the like. The network 140 may be the Internet and or other public or private networks or combinations thereof. The network 140 therefore should be understood to include any type of circuit switching network, packet switching network, or a combination thereof. Non-limiting examples of the network 140 may include a local area network (LAN), metropolitan area network (MAN), wide area network (WAN), and the like.

Client devices 150 may include any device configured to present user interfaces (UIs) 152 and receive user inputs, e.g., admin user inputs. The UIs 152 are generally graphical user interfaces (GUIs). For example, an admin user may use the UIs to provide configuration parameters, provide commands to implement the embodiments disclosed herein. Additionally, the UIs 152 can show the reports (e.g., tabular reports in Excel) generated by the server applications 122, 132.

First server 120, second server 130, first database 124, second database 134, and client devices 150 are each depicted as single devices for ease of illustration, but those of ordinary skill in the art will appreciate that first server 120, second server 130, first database 124, second database 134, and or client devices 150 may be embodied in different forms for different implementations. For example, any or each of first server 120 and second server 130 may include a plurality of servers or one or more of the first database 124 and second database 134. Alternatively, the operations performed by any or each of first server 120 and second server 130 may be performed on fewer (e.g., one or two) servers. In another example, a plurality of client devices 150 may communicate with first server 120 and or second server 130. A single user may have multiple client devices 150, and or there may be multiple users each having their own client devices 150.

Furthermore, it should be understood that the server applications 132, 134 running on the servers 120, 130, and the databases 124, 134 being hosted by the servers 120, 130 is just an example, and should not be considered limiting. Different portions of the server applications 132, 134 and, in one or more embodiments, the entirety of the server applications 132, 134 can be stored in the client devices 150. Similarly, different portions or even the entirety of the databases 124, 134 can be stored in the client devices 150. Therefore, the functionality described throughout this disclosure can be implemented at any portion of the system 100.

To overcome the mismatch between the object path and the table path, a comparison algorithm, based on the principles disclosed herein, progressively generalizes the object path to find its matching table path. In one or more embodiments, columns of an object path dataset are exploded to generate additional columns, each additional column is generated progressively stripping strings from the right of the corresponding object paths. The additional columns are appended to the right portion of the object path dataset such that each column to the right progressively generalizes the corresponding object path. On the table path dataset, two rows are generated for each table path, one row having partition information and another row not having the partition information. As the partition information on the table path may not be relevant for comparison, the comparison of object path dataset and the table path dataset is performed on the partition-less rows of the table path dataset.

In the object path dataset, the comparison moves from the left to the right, i.e., from more specific to more general. One iteration of comparison may generate a set of matches, which are recorded, and the corresponding matching rows are removed from the analysis in subsequent iterations. The next iteration moves to the next right column in the object path dataset, these additional sets of matches are recorded, and the corresponding matching rows are removed from the analysis in subsequent iterations. After a predetermined number of iterations (e.g., 8 iterations if 7 additional columns are generated for the object path dataset), the joining of the two datasets becomes a union of the matches from different iterations. This progressive generalization based matching yields $O(n)$ complexity compared to the conventional matching that has $O(n^2)$ complexity.

Observability metrics are generated based on the matchings. For example, some data tables may have a higher level of access and other data tables have a lower level of access. Some data tables may not be accessed at all. Thus, the observability metrics classify between the different types of tables. In one or more embodiments, the data tables with significantly lower level of access may be quarantined, e.g., the access privileges of a corresponding account may be revoked. Additionally or alternatively, the data tables with significantly lower level of access may be moved to a low-priority, low-cost cold storage.

Therefore, embodiments disclosed herein provide a significant improvement in data lake management. As data tables are classified based on their usage, highly used data tables can be prioritized for faster access and data tables with low usage can be moved to low-cost cold storage. Furthermore, accessibility to the data tables may be controlled based on the level of use. Additionally, pipelines dumping unused data tables may be decommissioned to further relieve the storage pressure on the data lake and reduce the huge pipeline compute cost. All of these processes may be automated and may be configured to run at predetermined time intervals, thereby requiring minimum human involvement.

Figure 2:
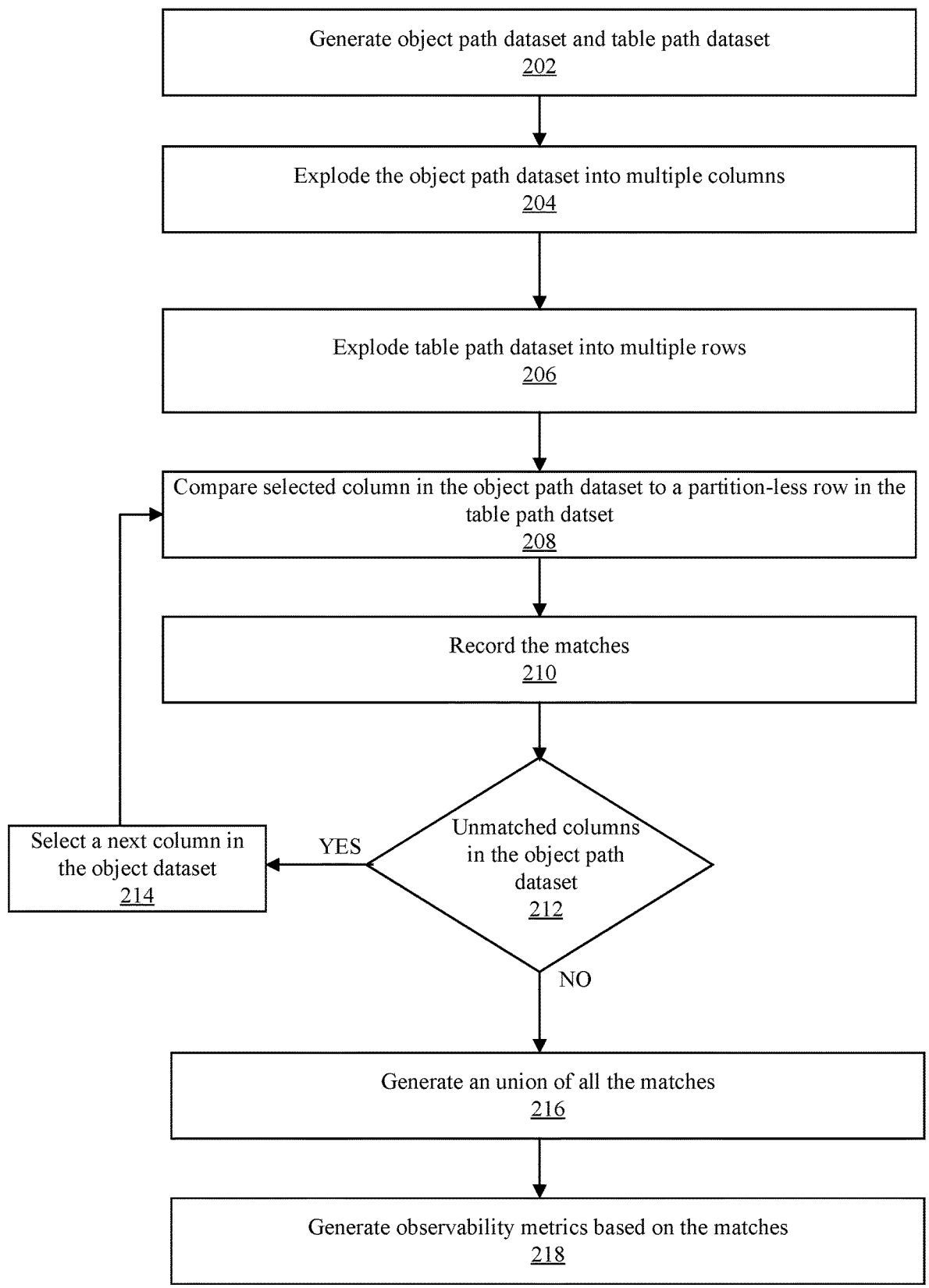
FIG. 2 shows a flow diagram of an example method based on the principles disclosed herein.

FIG. 2 shows a flow diagram of an example method 200 based on the principles disclosed herein. It should, however, be understood that the steps of the method 200 are provided as examples and should not be considered limiting. Therefore, methods with alternative, additional, or fewer number of steps should be considered within the scope of this disclosure. The steps of the method 200 may be performed by any combination of components of the system 100 shown in FIG. 1.

The method 200 begins at step 202 where the object path dataset and the table path dataset are generated. The object path dataset may be generated based on cloudtrail logs having records of data access in the data lake by an account in the system. The data access may be from different computation points in the system, and such access may be recorded on the cloudtrail logs (generally stored as parquet files). The fields within the object path dataset may include an object path, i.e., the pathway of access to a particular data table within the cloud. Additional fields may include an account identification (account id), IAM role for access, a flag for whether the access performed read or write operation, timestamp, etc. The table path dataset may include the data table names and their physical path in the data lake.

In one or more embodiments, the datasets are generated by filtering out extraneous data. In an example use case for AWS, cloudtrail logs involving only S3 access may be used on the object path dataset. Furthermore, only those buckets that have the data tables organized as hive tables are considered. Such filtration significantly reduces the compute and storage load when executing the method 200, which is one advantage provided by the disclosed principles.

At step 204, the object path dataset may be exploded (also referred to as expanded) into multiple columns. The multiple columns are generated by progressively removing strings from the object path to generate an expanded object path dataset. That is, within the expanded object path dataset, a first column has the original object path, a second column to the right of the first column will have a truncated object path with a portion of the string (e.g., on the right) being stripped away, a third column to the right of the second column will have a further truncated object path with an additional portion of the string (e.g., on the right) being stripped away, and so on. This progressive stripping of the string progressively generalizes the object path to be compared with other table paths.

Figure 3:
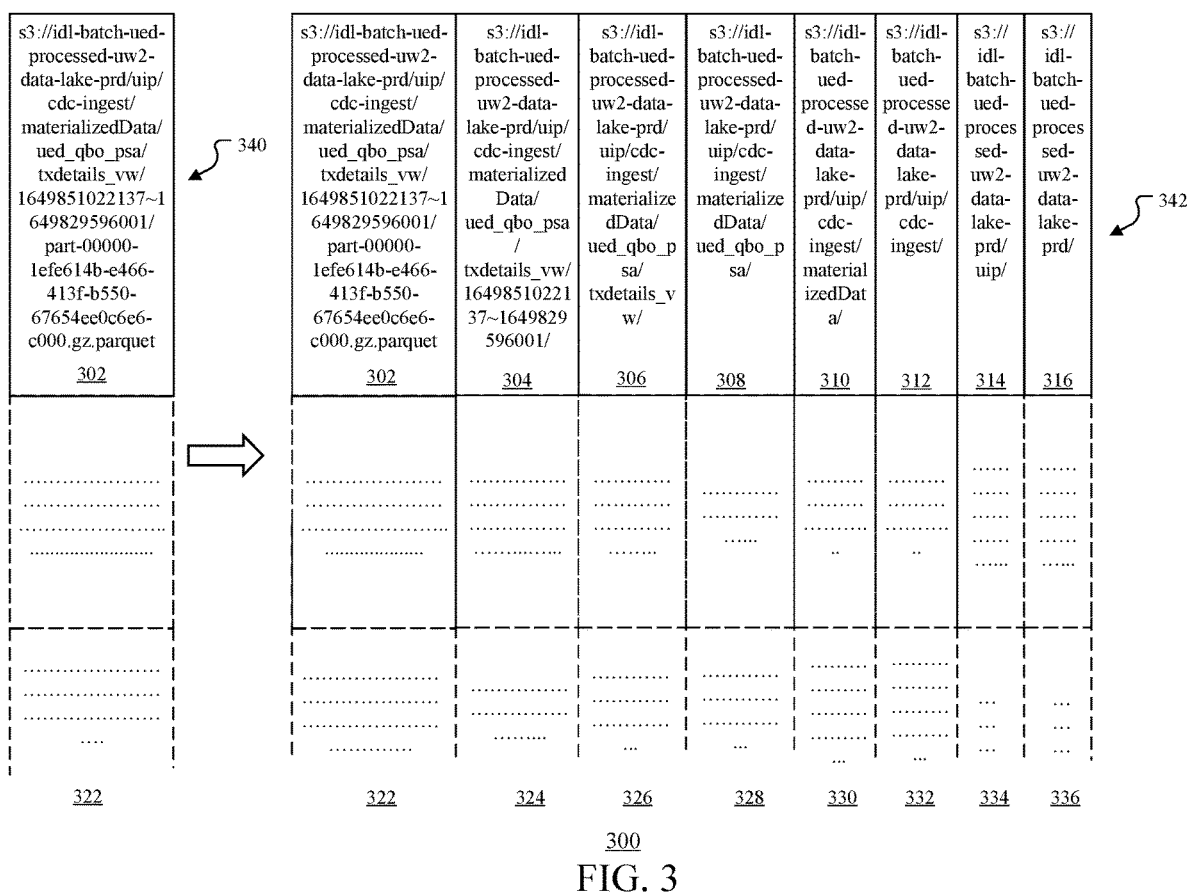
FIG. 3 shows an example process of exploding an object path dataset into multiple columns based on the principles disclosed herein.

FIG. 3 shows an example process 300 of exploding (or expanding) an object dataset into multiple columns based on the principles disclosed herein. The original object path 302 is a part of a column 322 (referred to below as the original column). That is, it should be understood that there are multiple object paths (e.g., forming the object path dataset 340) within the original column 322, but for the sake of brevity, operations on a single original object path 302 is described herein. As mentioned for step 204 of method 200, the original object path 302 can be progressively stripped from the right to further generalize the corresponding path at each of the successive steps.

As shown, the original column 322 has the original object path 302 ("s3://idl-batch-ued-processed-uw2-data-lake-prd/uip/cdc-ingest/materializedData/ued_qbo_psa/txdetails_vw/1649851022137~1649829596001/part-00000-1efe614b-e466-413f-b550-67654ee0c6e6-c000.gz.parquet"). A first column 324 is generated by removing "part-00000-1efe614b-e466-413f-b550-67654ee0c6e6-c000.gz.parquet" from the right portion of the path 302 to generate an object path 304 that includes only "s3://idl-batch-ued-processed-uw2-data-lake-prd/uip/cdc-ingest/materializedData/ued_qbo_psa/txdetails_vw/1649851022137~1649829596001/." Then, a second column 326 is generated by removing "1649851022137~1649829596001/" from the right portion of the path 304 to generate an object path 306 that includes only "s3://idl-batch-ued-processed-uw2-data-lake-prd/uip/cdc-ingest/materializedData/ued_qbo_psa/txdetails_vw/." A third column 328 is generated by removing "txdetails_vw/" from the right portion of the path 306 to generate an object 308 that includes only "s3://idl-batch-ued-processed-uw2-data-lake-prd/uip/cdc-ingest/materializedData/ued_qbo_psa/." A fourth column 330 is generated by removing "ued_qbo_psa/" from the right portion of the path 308 to generate an object 310 that includes only "s3://idl-batch-ued-processed-uw2-data-lake-prd/uip/cdc-ingest/materializedData/." A fifth column 332 is generated by removing "materializedData/" from the right portion of the path 310 to generate an object 312 that includes only "s3://idl-batch-ued-processed-uw2-data-lake-prd/uip/cdc-ingest/." A sixth column 334 is generated by removing "cdc-ingest/" from the right portion of the path 312 to generate an object 314 that includes only "s3://idl-batch-ued-processed-uw2-data-lake-prd/uip/." A seventh column 336 is generated by removing "uip/" from the right portion of the path 314 to generate an object 316 that includes only "s3://idl-batch-ued-processed-uw2-data-lake-prd/."

The explosion of the original column 302 generates an expanded object path dataset 342 with seven additional columns. In other words, the expanded object dataset 342 includes the original column 322 with the original object path 302 and seven additional columns including object paths with progressive stages of generalization: the first column 324, second column 326, third column 338, fourth column 330, fifth column 332, sixth column 334, and the seventh column 336. It should, however, be understood that this process of generating seven additional columns is just an example, and the progressive generalization of the object data path with additional or fewer number of columns should also be considered within the scope of this disclosure.

Returning back to FIG. 2, at step 206, the table path dataset may be exploded (or expanded) into multiple rows. For example, a table path may have partition information, which may be transitory. For example, the partition information in the table dataset may be newer than the partition information in the object dataset, which generally may be a day old. Therefore, a row explosion to generalize table path by removing the partition information may increase a likelihood of a match between the object path dataset and the table path dataset.

Figure 4:
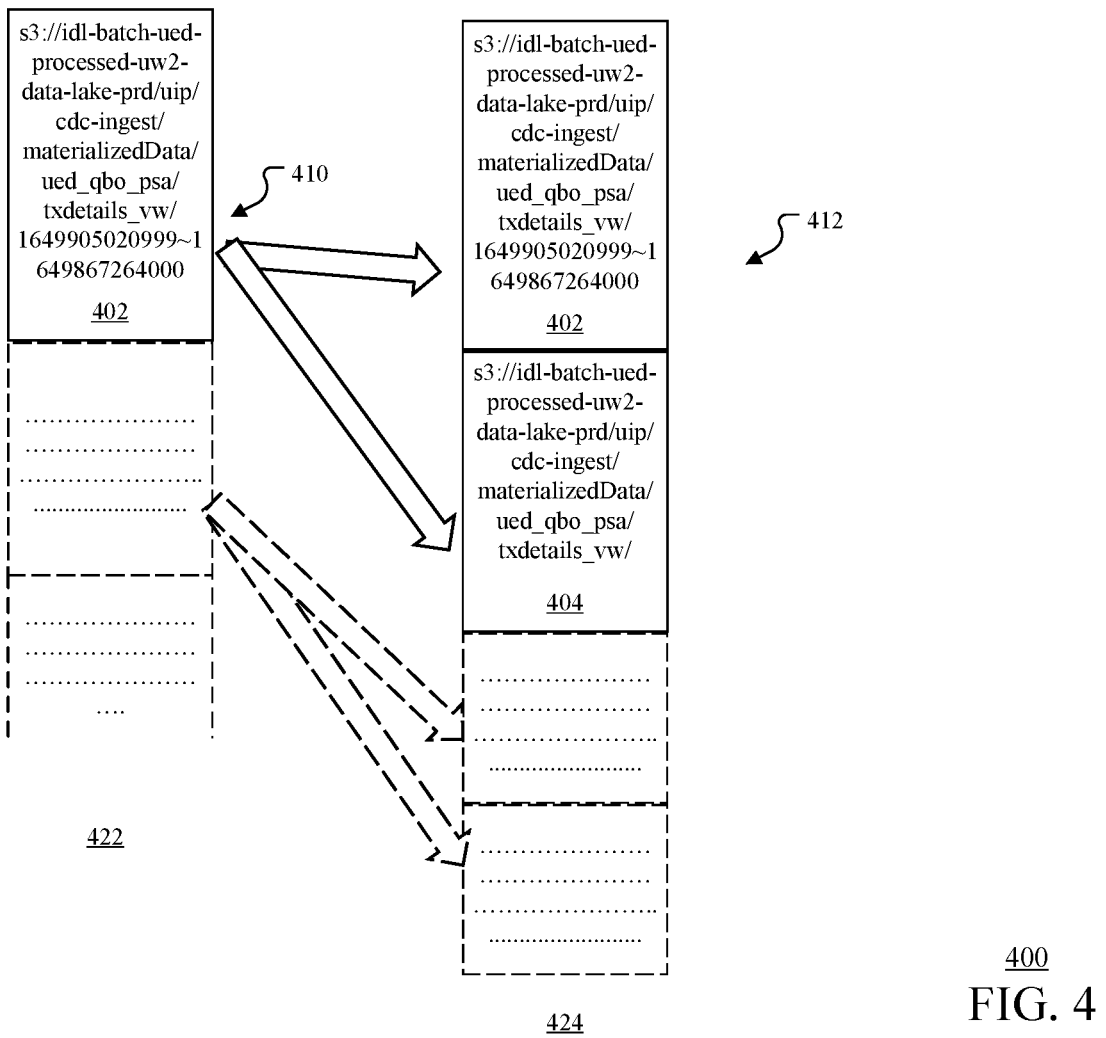
FIG. 4 shows an example process of exploding rows of a table path dataset into multiple rows based on the principles disclosed herein.

FIG. 4 shows an example process 400 of exploding (or expanding) rows of a table path dataset into multiple rows based on the principles disclosed herein. As shown, a table path dataset 410 includes a column 422 with a table path 402 that includes "s3://idl-batch-ued-processed-uw2-data-lake-prd/uip/cdc-ingest/materializedData/ued_qbo_psa/txdetails_vw/1649905020999~164986726400." An expanded table dataset 412 is generated by generating additional rows based on the original row and path 402. For example, the updated table dataset 412 includes the original table path 402 and an additional row with a table path 404 ("s3://idl-batch-ued-processed-uw2-data-lake-prd/uip/cdc-ingest/materializedData/ued_qbo_psa/txdetails_vw/") with the partition information ("1649905020999~1649867264000") removed from the original table path 402. Therefore, for every row in the table path dataset 410, two rows are generated in the expanded table dataset 412. It should, however, be understood that generating two rows for each row is just an example and should not be considered limiting. Embodiments that generate more than two rows for a single row should also be considered within the scope of this disclosure. Furthermore, of the table path 402 does not include the partition information, the same table path 402 may be duplicated into the two different rows.

Returning back to FIG. 2, at step 208, a selected column in the object dataset may be compared to an original row and a partition-less row in the table dataset. The comparison may begin from a column having specific object paths. For example, at the initial stage, the original column 322 (in FIG. 3) may be compared against both the original rows and the partition-less rows, e.g., the rows in the table path dataset 412 (in FIG. 4, table path 402 and table path 404). At step 210, the matches may be recorded. For example, an initial iteration may yield a 10% match, i.e., 10% of the rows in the expanded object path dataset 340 matched with a corresponding partition-less rows in the expanded table path dataset 412.

At step 212, it is determined whether there are unmatched columns in the expanded object path dataset 342. If there are unmatched columns, the execution moves to step 214 where a next column in the expanded object path dataset 342 may be selected for comparison. The selection of the next column where some specificity of the object path is stripped away may allow a comparison to a higher level of generality.

The iteration of the steps 208, 210, 212, 214 can be described with the following pseudocode implementing stepped operations to join the expanded object path dataset 342 and the expanded table path dataset 412. The below steps begin with the comparison between column 324 (including object path 304) in the modified object path dataset 342 with the partition-less rows (e.g., row including partition-less table path 404).

Operation 1:
    Object_Path_Dataset join with Table_Path_Dataset on column1=Original_Table_Path
    Output: column1_matched;
    Object_Path_Dataset_remaining_afterCol1_match join with Table_Path_Dataset on column1=partition_less_Table_Path;
    Output: column1_matched_partition_less_PATHS.

Operation 2
    Object_Path_Dataset_remaining_afterCol1_match_and_Col1_partition_less_match join with Table_Path_Dataset on column2=Original_Table_Path
    Output: column2_matched;
    Object_Path_Dataset_remaining_afterCol2_matchjoin with Table_Path_Dataset on column2=partition_less_Table_Path;
    Output: column2_matched_partition_less_PATHS.

Operation 3
    Object_Path_Dataset_remaining_afterCol2_match_and_Col2_partition_less_match join with Table_Path_Dataset on column3=Original_Table_Path
    Output: column3_matched;
    Object_Path_Dataset_remaining_afterCol3_match join with Table_Path_Dataset on column3=partition_less_Table_Path;
    Output: column3_matched_partition_less_PATHS.

Operation 4
    Object_Path_Dataset_remaining_afterCol3_match_and_Col3_partition_less_match join with Table_Path_Dataset on column4=Original_Table_Path
    Output: column4_matched;
    Object_Path_Dataset_remaining_afterCol4_match join with Table_Path_Dataset on column4=partition_less_Table_Path;
    Output: column4_matched_partition_less_PATHS.

Operation 5
    Object_Path_Dataset_remaining_afterCol4_match_and_Col4_partition_less_match join with Table_Path_Dataset on column5=Original_Table_Path
    Output: column5_matched;
    Object_Path_Dataset_remaining_afterCol5_match join with Table_Path_Dataset on column5=partition_less_Table_Path;
    Output: column5_matched_partition_less_PATHS.

Operation 6
    Object_Path_Dataset_remaining_afterCol5_match_and_
        Col5_partition_less_match join with Table_Path_Dataset on column6==Original_Table_Path
    Output: column6_matched;
    Object_Path_Dataset_remaining_afterCol6_match join with Table_Path_Dataset on column6==partition_less_Table_Path
    Output: column6_matched_partition_less_PATHS.
Operation 7
    Object_Path_Dataset_remaining_afterCol6_match_and_
        Col6_partition_less_match join with Table_Path_Dataset on column7==Original_Table_Path
    Output: column7_matched;
    Object_Path_Dataset_remaining_afterCol7_match join with Table_Path_Dataset on column6==partition_less_Table_Path
    Output: column5_matched_partition_less_PATHS.

After the above iterations, at step 216, a union of the all the matches may be generated. Continuing with the above pseudo-code, the final output of the matches will be:
    finalOutput=Union (column1_matched, column1_matched_partition_less_PATHS, column2_matched, column2_matched_partition_less_PATHS, column3_matched, column3_matched_partition_less_PATHS, column4_matched, column4_matched_partition_less_PATHS, column5_matched, column5_matched_partition_less_PATHS, column6_matched, column6_matched_partition_less_PATHS, column7_matched, column7_matched_partition_less_PATHS).

As such, the complexity of these matching operations is O(n) compared to the conventional matching operations that have a $O(n^2)$ complexity.

At step 218, observability metrics are generated based on the matches. The observability metrics indicate the aggregate level of access to different data tables within the data lake. The observability metrics may further categorize the data tables (e.g., low use, medium use, high use, not accessed and not refreshed, etc.) and perform one or more downstream operations (e.g., generate reports, quarantine data tables, etc.) as further described below.

Figure 5:
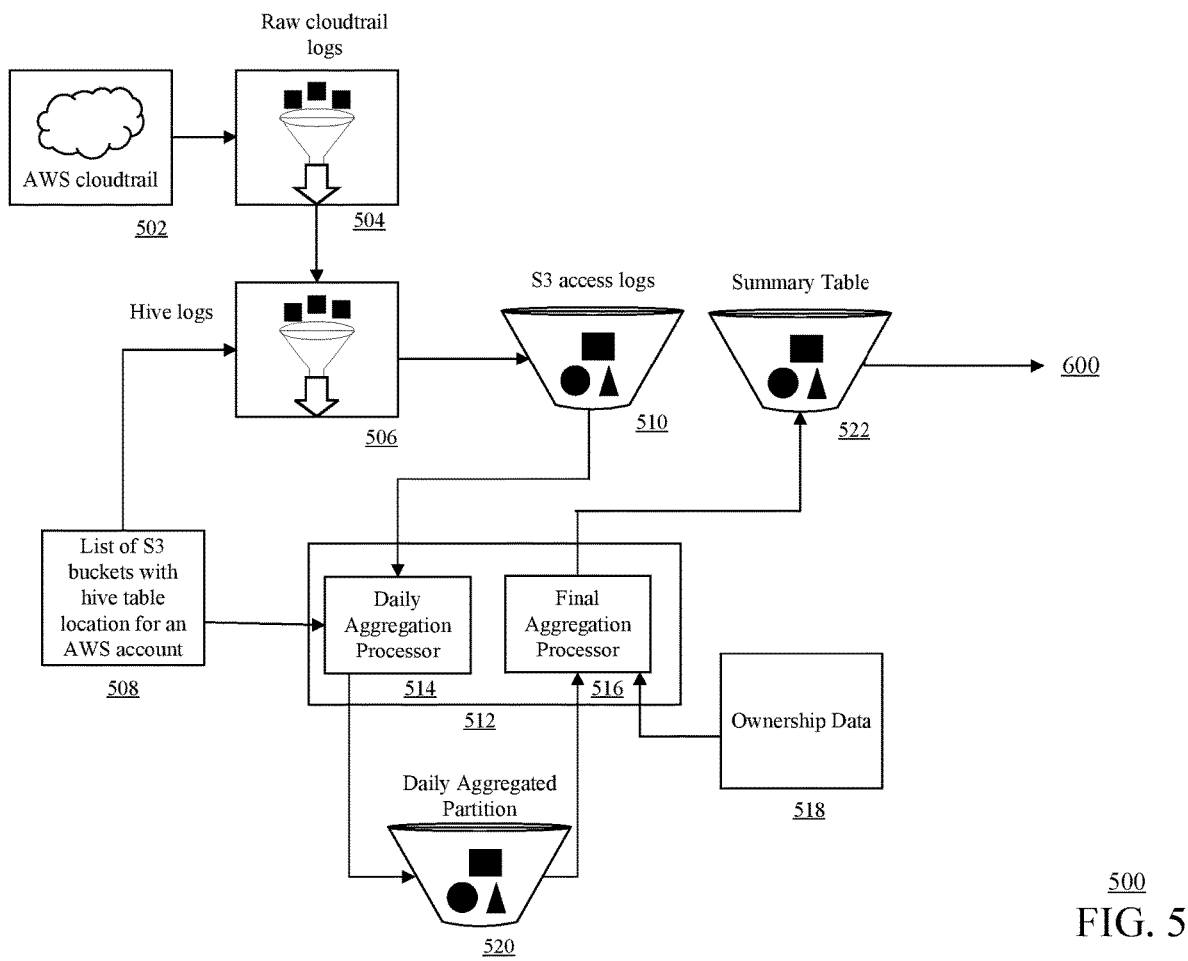
FIG. 5 shows an example architecture configured for building observability metrics of data lake data access based on the principles disclosed herein.

FIG. 5 shows an example architecture 500 configured for building observability metrics for data lake data access based on the principles disclosed herein. It should be understood that the components of the architecture 500 are merely intended as examples and should not be considered limiting. Architectures with additional, alternative, or fewer number of components should be considered within the scope of this disclosure. Furthermore, the architecture 500 is described in association with AWS as cloud service provider, which is just for the sake of brevity. The architecture 500 may function in association with any cloud service provider. Additionally, the architecture 500 can be implemented within the system 100, and the architecture 500 may be used to implement the method 200.

In the architecture 500, raw cloudtrail logs 504 are extracted from an AWS cloudtrail 502. The raw cloudtrail logs 504 have records (i.e., logs) of different computation points within a system accessing different AWS S3 buckets. From the raw cloudtrail logs 504, hive logs 506, pertaining to the hive tables (e.g., the data tables are organized as hive tables within the buckets), are filtered and extracted. That is, the buckets have extraneous data (e.g., unstructured data such as audio, image, video, and log files), which may not be subjected to the algorithmic analysis described herein. The filtering out of this non-hive table extraneous data increases the efficiency of the algorithm because cloudtrail logs to this data are not further analyzed.

In example analysis, hive logs 506 for a specific AWS account may be further filtered by a list of S3 buckets with a hive table location for an AWS account 508 may be retrieved from a metadata repository (MDR). In other words, the algorithm described herein can be implemented in an account-by-account basis. The output schema for the list of S3 buckets with hive table location for the AWS account 508 may be as follows:

| Field name | Data type | Value |
| --- | --- | --- |
| aws_account_id | string | AWS account ID |
| s3_bucket_name | string | Bucket in the AWS account where the hive table data resides |
| hive_table_name | string | The Hive table name in the format "schema_name", "table_name" |
| location | string | The path under the bucket where the table data resides. |

Using this output schema, the hive logs 506 may be filtered to generate S3 access logs 510 (e.g., as individual parquet files that include the individual object path data), which are then processed by a daily aggregation processor 514 within a batch processing platform processing (BPP) pipeline 512. The BPP pipeline 512 processes the S3 access logs 510 in batches (e.g., daily) for efficiency rather than a continuous real-time processing.

Particularly, the daily aggregation processor 514 implements, e.g., on a daily basis daily aggregator processor job to generate a daily aggregated partition 520. The job, as implemented by the daily aggregation processor 514, reads the S3 access logs 510 for a given AWS account Id and for those S3 buckets that are linked to hive tables in the MDR. The daily aggregation processor 514 implements the steps of the method 200 to map the object paths with the table paths in the list of S3 buckets with hive table locations for the AWS account 508 The output table in the daily aggregated partition 520 (which may be written to S3) includes the following fields of interest:

| Field Name | Data type | Value it Holds |
| --- | --- | --- |
| hive_table_name | String | Fully Qualified Name of hive table on which the access and refresh activity was performed |
| total_reads | bigint | No of read logs on the hive table content |
| total_writes | bigint | No of write logs on the hive table content |
| useraccountid | string | AWS Account No which was used to access or refresh the hive table contents |
| arn | string | AWS IAM role details used to access or refresh the hive table data |
| max_eventtime | timestamp | The max timestamp recorded for an access or refresh |

| Field Name | Data type | Value it Holds |
|---|---|---|
| | | Partition columns |
| aws_account | string | AWS Account in which hive table's S3 bucket is located |
| year | string | year when the table was accessed or refreshed |
| month | string | month when the table was accessed or refreshed |
| day | string | day when the table was accessed or refreshed |

The daily aggregation processor 514 further analyzes the daily aggregated partition 520. Particularly, the daily aggregation processor 514 implements the steps of the method 200 to map the object paths in the daily aggregated partition 520 with the table paths in the list of S3 buckets with hive table locations for the AWS account 508. the final aggregation processor 516 (also a part of the BPP pipeline 512) generates a last day, last week, last month, last three months aggregated read/writes data based on the output of the analysis of the daily aggregated partition 520. For example, the final aggregation processor may generate summary table 522 showing the differing levels of access of the data tables (stored as hive tables) in S3. Furthermore, the final aggregation processor 516 receives ownership data 518 from the MDR to determine where the summary table 522 is to be sent. The summary table 522 is then provided to architecture 600 (shown in FIG. 6) to control the access of the data tables (e.g., by quarantining) in S3.

Figure 6:
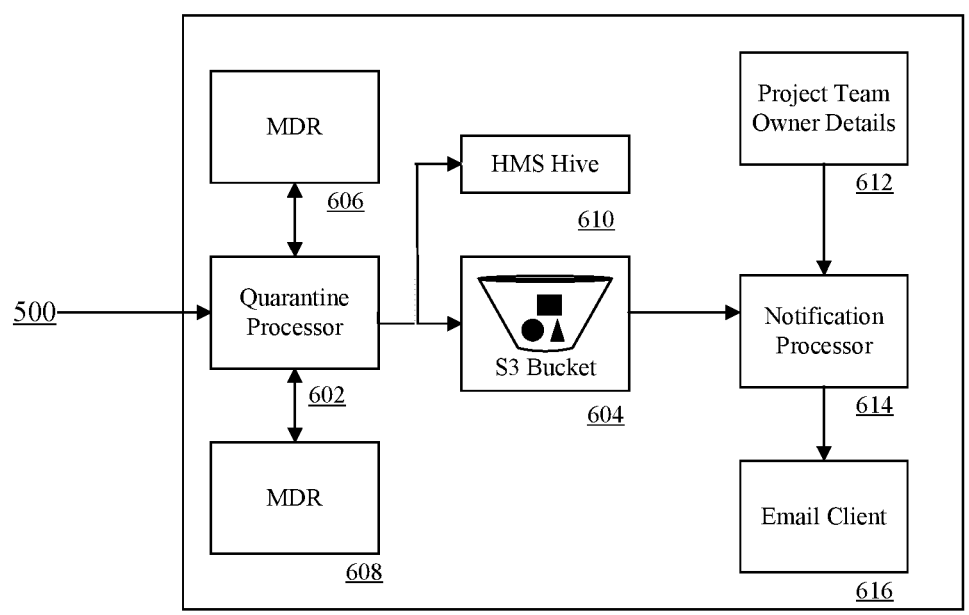
FIG. 6 shows an example architecture configured for data table access control based on the observability metrics generated using the FIG. 5 architecture based on the principles disclosed herein.

FIG. 6 shows an example architecture 600 configured for data table access control based on the observability metrics generated using architecture 500 based on the principles disclosed herein. It should be understood that the components of the architecture 600 are merely intended as examples and should not be considered limiting. Architectures with additional, alternative, or fewer number of components should be considered within the scope of this disclosure. Furthermore, the architecture 600 is described in association with AWS as cloud service provider, which is just for the sake of brevity. The architecture 600 may function is association with any cloud service provider. Additionally, the architecture 500 can be implemented within the system 100.

Within the architecture, a quarantine processor 602 receives the summary table 522 that includes the observability metrics. The quarantine processor 602 particularly controls access to the data tables in the S3 bucket based on the observability metrics in the summary table 522. Furthermore, the quarantine processor 602 runs cleanup operations in the hive meta store (HMS) 610 to remove unused data tables into cold storage (e.g., low cost storage).

The quarantine processor 602 runs different algorithms to control access to the data tables based on the observability metrics. For example, an access to the data tables that the AWS account has not used for a long time may be revoked. An example code executed by the quarantine processor 602 for denying access to a given data table may be as follows:

```
{
  "Version": "2012-10-17",
  "Statement": [
    {
      "Sid": "DenyTableAccess",
      "Effect": "Deny",
      "Princinpal": {
        "AWS": "S3:*"
      },
      "Action": "*",
      "Resource": [
        "arn:aws:s3:::idl-batch-ued-processed-uw2-data-lake-prd/Table1/location",
        "arn:aws:s3:::idl-batch-ued-processed-uw2-data-lake-prd/Table2/location",
      ]
    }]
}
```

In one or more embodiments, access may be denied, but some users may be whitelisted. To do this access control, the quarantine processor 602 may run the following code:

```
{
  "Version": "2012-10-17",
  "Statement": [
    {
      "Sid": "DenyTableAccess",
      "Effect": "Deny",
      "NotPrincinpal": {
        "AWS": "arn:aws:iam::062864819864:role/WhiteListedUsr"
      },
      "Action": "S3:*",
      "Resource": [
        "arn:aws:s3:::idl-batch-ued-processed-uw2-data-lake-prd/Table1/location",
        "arn:aws:s3:::idl-batch-ued-processed-uw2-data-lake-prd/Table2/location",
      ]
    }]
```

In one or more embodiments, the quarantine processor 602 may not have to perform quarantine operations based on the observability metrics in the summary table. In that case, the quarantine processor 602 runs the following "do nothing" code:

{
  "Version": "2012-10-17",
  "Statement": [ ]
}

The quarantine processor 602 also updates the MDRs 606, 608 based on running these access control codes.

The final output generated by the quarantine processor 602 includes a file (e.g., an Excel file) with a list of tables, their paths, AWS account details, and whether access has to be restricted or not. An entry in the Excel file may include, for example, TableName, Path, Bucket, AWS Account, Quarantine→Yes or No. The file may be stored in an S3 bucket 604 and also sent to a notification processor 614. The notification processor 614 retrieves project owner team details 612 and provides the file to the project owner through an e-mail client 615. All of these processes may be automated to run at predetermined periods of time, e.g., daily, and the file may be automatically and periodically provided to the project team owner.

Figure 7:
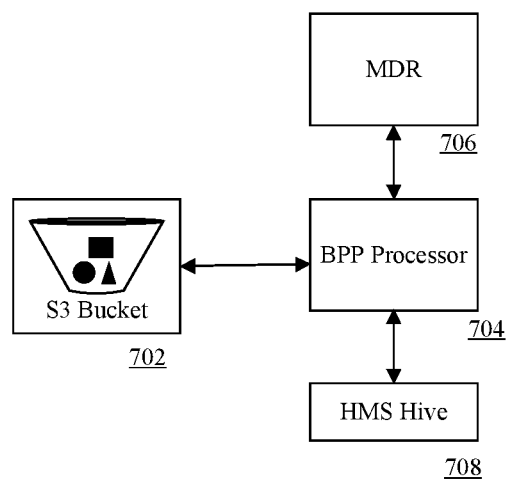
FIG. 7 shows an example architecture configured for recovering data tables based on the principles disclosed herein.

FIG. 7 shows an example architecture 700 configured for recovering data tables based on the principles disclosed herein. The data tables to be recovered may have been flagged for denying access and/or may have been moved to cold storage. The recovery may be to restore accessibility of the data tables for an AWS account.

Within the architecture, a recovery processor 704 loads a file from S3 bucket 702. The file includes data table names (to be recovered). The recovery processor 704 then triggers a recovery process pipeline after loading the file. The recovery processor 704 validates the statuses of the table with the MDR and gets their original locations from the S3 bucket. The recovery processor 704 then creates a hive alter SQL file, using HMS hive 708, and uploads the hiver alter SQL file to S3. Then recovery processor 704 then executes the Hive SQL commands (e.g., to change the accessibility of the data tables being recovered) and updates the MDR. The recovery processor 704 then adds the recovered data tables to an exception list. That is, the recovery processor 704 indicates that the denial policy to the data tables is no longer relevant and exceptions to these data tables is to be implemented.

In addition to the benefits described throughout this disclosure, embodiments disclosed herein may provide other benefits. For example, the observability metrics may be used for search de-ranking. Low usage data tables may be ranked below compared to the high usage data tables—such that a user may readily see a more relevant data table (e.g., based on the usage). Furthermore, observability metrics may assist debugging teams to reach out to downstream users based on the accounts and the corresponding IAM roles used to access the hive table's data. As described throughout this disclosure, the observability metrics provide the mapping between the users, accounts, IAM roles, etc. with the usage of the data in the hive tables.

Figure 8:
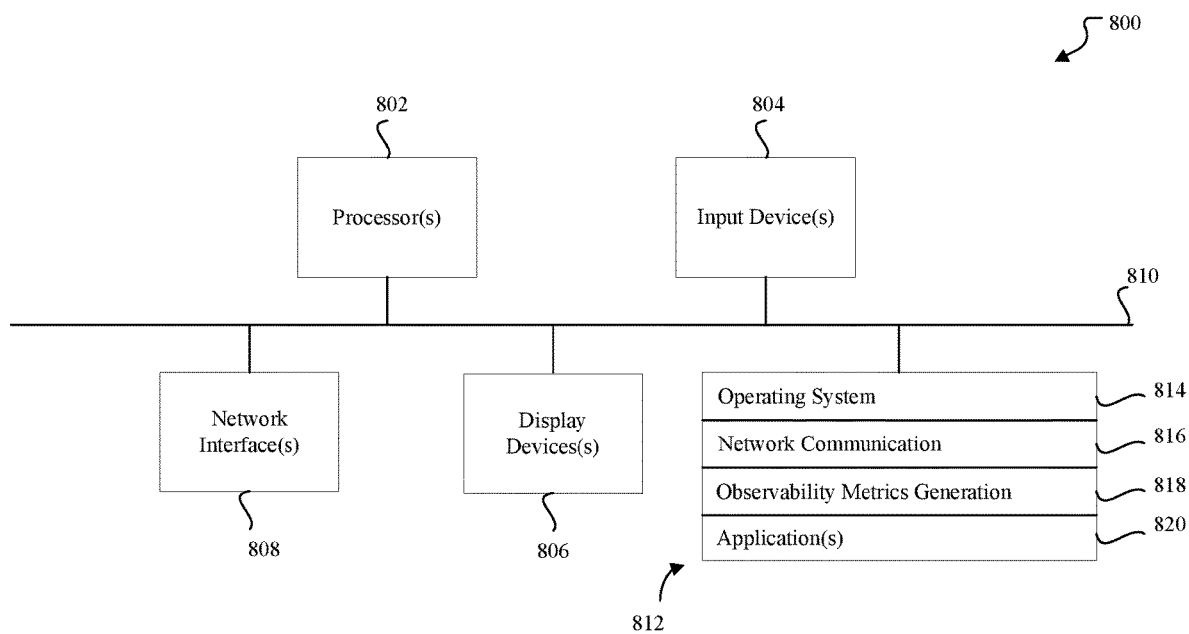
FIG. 8 shows a block diagram of an example computing device that implements various features and processes based on the principles disclosed herein.

FIG. 8 shows a block diagram of an example computing device 800 that implements various features and processes based on the principles disclosed herein. For example, computing device 800 may function as first server 120, second server 130, client 150a, client 150b, data lake 160 or a portion or combination thereof in some embodiments. The computing device 800 also performs one or more steps of the method 200. The computing device also forms different components of the architectures 500, 600, 700. The computing device 800 is implemented on any electronic device that runs software applications derived from compiled instructions, including without limitation personal computers, servers, smart phones, media players, electronic tablets, game consoles, email devices, etc. In some implementations, the computing device 800 includes one or more processors 802, one or more input devices 804, one or more display devices 806, one or more network interfaces 808, and one or more computer-readable media 812. Each of these components is be coupled by a bus 810.

Display device 806 includes any display technology, including but not limited to display devices using Liquid Crystal Display (LCD) or Light Emitting Diode (LED) technology. Processor(s) 802 uses any processor technology, including but not limited to graphics processors and multi-core processors. Input device 804 includes any known input device technology, including but not limited to a keyboard (including a virtual keyboard), mouse, track ball, and touch-sensitive pad or display. Bus 810 includes any internal or external bus technology, including but not limited to ISA, EISA, PCI, PCI Express, USB, Serial ATA or FireWire. Computer-readable medium 812 includes any non-transitory computer readable medium that provides instructions to processor(s) 802 for execution, including without limitation, non-volatile storage media (e.g., optical disks, magnetic disks, flash drives, etc.), or volatile media (e.g., SDRAM, ROM, etc.).

Computer-readable medium 812 includes various instructions 814 for implementing an operating system (e.g., Mac OS®, Windows®, Linux). The operating system may be multi-user, multiprocessing, multitasking, multithreading, real-time, and the like. The operating system performs basic tasks, including but not limited to: recognizing input from input device 804; sending output to display device 806; keeping track of files and directories on computer-readable medium 812; controlling peripheral devices (e.g., disk drives, printers, etc.) which can be controlled directly or through an I/O controller; and managing traffic on bus 810. Network communications instructions 816 establish and maintain network connections (e.g., software for implementing communication protocols, such as TCP/IP, HTTP, Ethernet, telephony, etc.).

Observability metrics generation 818 include instructions that implement the disclosed embodiments for generating observability metrics and performing downstream operations.

Application(s) 820 may comprise an application that uses or implements the processes described herein and/or other processes. The processes may also be implemented in the operating system.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment. In one embodiment, this may include Python. The computer programs therefore are polyglots.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A computer-implemented method comprising:
   generating an object path dataset comprising a plurality of rows of object paths for accessing corresponding data tables in a data lake;
   generating a table path dataset comprising a plurality of rows of table paths for physical addresses of the corresponding data tables in the data lake;
   expanding columns of the object path dataset to generate an expanded object path dataset by adding a plurality of additional columns, each additional column including object paths with a portion of information stripped away from corresponding object paths in a previous column;
   expanding rows of the table path dataset to generate an expanded table path dataset by adding an additional row for each original row, the additional row comprising a corresponding table path without partition information;
   iteratively matching the columns of the expanded object path dataset to the original rows and the additional rows; and
   generating observability metrics of access of the data tables based on the iterative matching.

2. The computer-implemented method of claim 1, further comprising:
   classifying a first data table as having low usage based on the observability metrics.

3. The computer-implemented method of claim 2, further comprising:
   changing an access permission of the first data table based on the classifying.

4. The computer-implemented method of claim 2, further comprising:
   moving the first data table to a cold storage based on the classifying.

5. The computer-implemented method of claim 1, the generating the object path dataset comprising:
retrieving cloudtrail logs associated with an account having access to the data tables.

6. The computer-implemented method of claim 5, the generating the object path comprising:
filtering the cloudtrail logs to retain only the cloudtrail logs of buckets having hive tables.

7. The computer-implemented method of claim 1, the generating the object path dataset comprising:
retrieving cloudtrail logs from the data lake, the cloudtrail log being associated with an account having access to the data tables.

8. The computer-implemented method of claim 1, the generating the observability metrics comprising:
generating the observability metrics based on a union of the iterative matching across a plurality of iterations.

9. The computer-implemented method of claim 1, the generating the observability metrics comprising:
automatically generating the observability metrics at predetermined time intervals.

10. The computer-implemented method of claim 1, further comprising:
automatically generating and transmitting a tabular report based on the observability metrics.

11. A system comprising:
a non-transitory storage medium storing computer program instructions; and
a processor configured to execute the computer program instructions to cause operations comprising:
generating an object path dataset comprising a plurality of rows of object paths for accessing corresponding data tables in a data lake;
generating a table path dataset comprising a plurality of rows of table paths of physical addresses for the corresponding data tables in the data lake;
expanding columns of the object path dataset to generate an expanded object path dataset by adding a plurality of additional columns, each additional column including object paths with a portion of information stripped away from corresponding object paths in a previous column;
expanding rows of the table path dataset to generate an expanded table path dataset by adding an additional row for each original row, the additional row comprising a corresponding table path without partition information;
iteratively matching the columns of the expanded object path dataset to the original rows and the additional rows; and
generating observability metrics of access of the data tables based on the iterative matching.

12. The system of claim 11, the operations further comprising:
classifying a first data table as having a low usage based on the observability metrics.

13. The system of claim 12, the operations further comprising:
changing an access permission of the first data table based on the classifying.

14. The system of claim 12, the operations further comprising:
moving the first data table to a cold storage based on the classifying.

15. The system of claim 12, the generating the object path dataset comprising:
retrieving cloudtrail logs associated with an account having access to the data tables.

16. The system of claim 15, the generating the object path comprising:
filtering the cloudtrail logs to retain only the cloudtrail logs of buckets having hive tables.

17. The system of claim 11, the generating the object path dataset comprising:
retrieving cloudtrail logs from the data lake, the cloudtrail log being associated with an account having access to the data tables.

18. The system of claim 11, the generating the observability metrics comprising:
generating the observability metrics based on a union of the iterative matching across a plurality of iterations.

19. The system of claim 11, the generating the observability metrics comprising:
automatically generating the observability metrics at predetermined time intervals.

20. The system of claim 11, the operations further comprising:
automatically generating and transmitting a tabular report based on the observability metrics.

* * * * *